Patented Dec. 7, 1926.

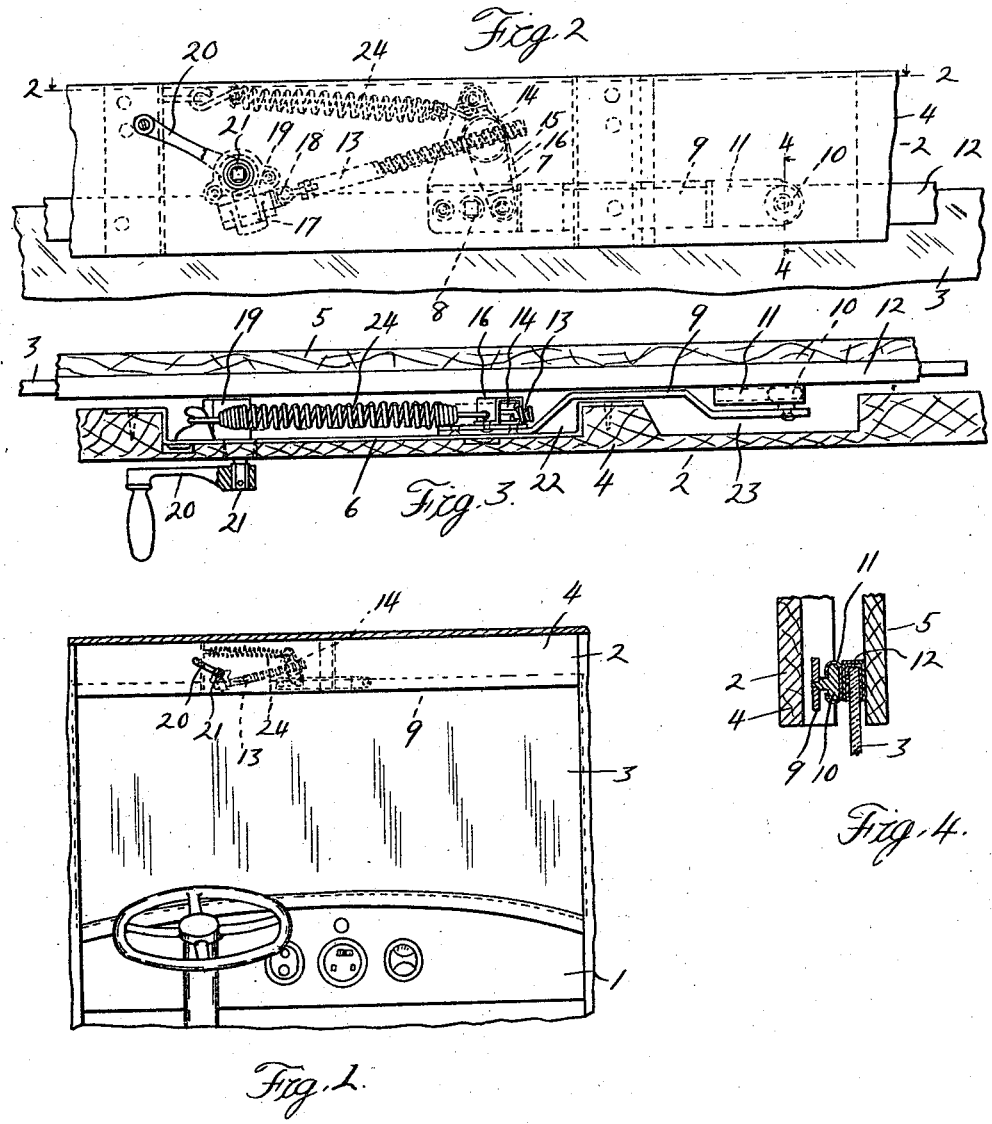

1,609,301

UNITED STATES PATENT OFFICE.

STANLEY W. NICHOLSON, GRANT W. CRAMER, ANGUS GRANT, AND CLARENCE E. RICKEL, OF TOLEDO, OHIO, ASSIGNORS TO THE DURA COMPANY, OF TOLEDO, OHIO, A CORPORATION OF OHIO.

WINDSHIELD REGULATOR.

Application filed July 27, 1925. Serial No. 46,454.

The invention relates to windshield regulators and has for one of its objects the provision of a compact mechanism for operating the windshield, this mechanism being so arranged that it is located within the header above the opening. Another object is to provide mechanism driven from near one end of the header and connected to the windshield near its middle for operating the same. A further object is to provide mechanism including a revoluble screw mounted upon a mounting plate which is secured to the header and is channel shaped to receive the screw and other parts of the mechanism immediately connected thereto. With these as well as other objects in view the invention resides in the novel features of construction and combinations and arrangements of parts as more fully hereinafter set forth.

In the drawings:—

Figure 1 is a rear elevation of the cowl and windshield portion of a motor vehicle, having applied thereto a windshield regulator embodying our invention;

Figure 2 is an enlarged rear elevation of a portion thereof;

Figures 3 and 4 are cross sections on the lines 3—3 and 4—4, respectively, of Figure 2.

As shown in the present instance our windshield regulator is applied to a motor vehicle body having the cowl 1, the header 2 spaced above the cowl and the windshield 3 for normally closing the space between the cowl and header. The header 2 comprises the spaced rear and front walls 4 and 5, respectively, between which the upper edge of the windshield extends.

For raising and lowering the windshield we have provided mechanism which is mounted upon the rear wall 4 of the header and is connected to the upper edge of the windshield near its middle and is driven from near the end of the header in advance of the steering wheel so that the driver of the motor vehicle may easily actuate the mechanism. In detail, 6 is a mounting plate which extends horizontally of and is secured to the front side of the rear header wall 4. 7 is a bell crank pivotally mounted at 8 upon the mounting plate and having one arm 9 provided with the roller 10 engaging in the channel-shaped retainer 11, which is located at the middle of the upper edge of the windshield. This retainer is secured to the rear side of the channel 12, which embraces and is secured to the upper edge of the windshield. The bell crank is actuated by means of the revoluble screw 13 which engages the nut 14 journaled upon the other arm 15 of the bell crank and is secured in place by means of the clip 16 which is secured to the arm 15 and is located at the front side of the nut and has an opening in which the nut is also journaled. The screw 13 is rotated from the gearing 17 through the universal joint 18, the gearing being located within the gear housing 19 which is secured upon the mounting plate 6 in advance of the steering wheel of the motor vehicle so that the driver may have easy access thereto. A suitable handle 20 is provided upon the drive shaft 21 for operating the gearing.

For the purpose of decreasing the depth of the header 2 this header has the front side of its rear wall 4 recessed at 22 and 23, the former recess receiving the mounting plate 6 and the latter recess the outer end of the arm 9 and the retainer 11. The main portion of the bell crank 7 is located within the channel of the mounting plate as is also the screw 13 and the gear housing 19 and associated parts. Furthermore, we have also located the coil counter-balancing spring 24 for the windshield in the channel of the mounting plate, this counterbalancing spring being connected to the arm 15 of the bell crank and to the mounting plate above the gear housing. The arm 9 of the bell crank extends from the channel of the mounting plate and is return bent to extend into the recess 23 of the rear wall 4 of the header.

From the above description it will be seen that we have provided a simple compact arrangement of regulator for a windshield which is connected to the windshield near the middle of its upper edge and may be driven from a position in advance of the steering wheel of the motor vehicle. It will also be seen that the construction of regulator is such that the windshield is held in its various adjusted positions without the necessity of providing an extra lock.

What we claim as our invention is:

1. The combination with a vehicle body having an opening with a header above the opening and a closure for the opening, of a regulator for raising and lowering said closure comprising a horizontally extending mounting plate mounted upon said header, a drive shaft mounted upon said mounting plate and located in one end of said header, a lifter arm having one end connected to said closure near its middle and the other end pivotally mounted upon said mounting plate intermediate said drive shaft and point of connection of said lifter arm with said closure, and a driving connection extending between said drive shaft and lifter arm for swinging the latter from the former.

2. The combination with a vehicle body having an opening with a header above the opening and a closure for the opening, of a regulator for raising and lowering said closure comprising a horizontally extending mounting plate mounted upon said header, a bell crank pivotally mounted upon said mounting plate and having one arm connected to said closure, a screw connected to the other arm of said bell crank for swinging the latter upon rotation of the former and means mounted upon said header and laterally spaced from the pivot for said bell crank and connected to said screw for rotating the latter.

3. The combination with a vehicle body having an opening with a header above the opening and a windshield for the opening, of a regulator for raising and lowering said windshield comprising a horizontally extending channel shaped mounting plate secured upon said header, a bell crank pivotally mounted upon said mounting plate and having one arm located within the channel thereof and another arm extending from the channel and connected to said windshield, a drive shaft mounted upon said mounting plate, and a driving connection between said drive shaft and first mentioned arm of said bell crank, said driving connection being located within the channel of said mounting plate.

4. The combination with a vehicle body having an opening with a header above the opening and a windshield for the opening, of a regulator for raising and lowering said windshield comprising a horizontally extending mounting plate secured upon said header, a bell crank pivotally mounted upon said mounting plate and having an arm located within the channel thereof and another arm extending from the channel and connected to said windshield, a screw connected to the first mentioned arm of said bell crank and located within the channel of said mounting plate, and gearing mounted upon said mounting plate within the channel thereof and connected to said screw for rotating the same.

In testimony whereof we affix our signatures.

STANLEY W. NICHOLSON.
GRANT W. CRAMER.
CLARENCE E. RICKEL.
ANGUS GRANT.